United States Patent [19]

Curtin

[11] Patent Number: 4,460,473

[45] Date of Patent: Jul. 17, 1984

[54] MEMBRANE DISTILLATION METHOD

[75] Inventor: Daniel J. Curtin, Danville, Calif.

[73] Assignee: Atlantic Richfield Company, Los Angeles, Calif.

[21] Appl. No.: 222,818

[22] Filed: Jan. 5, 1981

[51] Int. Cl.³ .................. B01D 31/00; B01D 13/00
[52] U.S. Cl. .................................. 210/640; 210/259
[58] Field of Search ............................ 210/640, 259; 159/DIG. 27

[56] References Cited

U.S. PATENT DOCUMENTS

| | | | |
|---|---|---|---|
| 3,228,876 | 1/1966 | Mahon | 159/DIG. 27 |
| 3,405,058 | 10/1968 | Miller | 210/640 |
| 3,428,556 | 2/1969 | Gunther | 210/259 X |
| 3,436,343 | 4/1969 | Smith | 210/32 |

Primary Examiner—Frank A. Spear, Jr.
Attorney, Agent, or Firm—Robert M. Betz

[57] ABSTRACT

A method and system for desalination of water by so called membrane distillation, wherein saline water is evaporated through the pores of a membrane whose proper operation requires that it not be wetted by either the distilland or distillate. Therefore, liquid intrusion into the pores of the membrane through which the distillate passes must be prevented by the surface tension of the liquid. Surfactants normally found in the saline feed water which have been found to cause liquid intrusion into the pores of the membrane are removed immediately prior to the distillation step by physical or chemical means such as adsorption by activated charcoal.

12 Claims, 3 Drawing Figures

MEMBRANE DISTILLATION METHOD

BACKGROUND OF THE INVENTION

1. Field of the Invention

This invention relates generally to the field of membrane distillation and more particularly to the desalination of water by evaporation through a porous membrane.

2. Description of the Prior Art

It is possible to separate a more volatile component from a solution by distillation through the pores of a membrane which is not wetted by either the distillate or distilland. This process, which has been referred to variously as vapor gap distillation, or membrane distillation, is distinguished from other membrane processes, such as reverse osmosis, by the fact that it involves a change of phase (liquid to vapor) as material is evaporated from the distilland to the distillate. A requirement of this process is that the nature of the membrane be such that it is wet by neither the distillate nor the distilland and thus liquid intrusion into the pores through which the distillate vapors pass is prevented by the surface tension of liquid at the liquid/vapor/membrane interface. This process and its advantages are described by Weyl in U.S. Pat. No. 3,340,186, by Rodgers in U.S. Pat. Nos. 3,406,096 and 3,650,905, Findley and others in numerous articles. Weyl points out that it is possible to distill at a high thermal efficiency by arranging the membranes in certain configurations and reusing the heat recovered upon condensation of the distillate. In one preferred application, the recovery of fresh water from seawater, it has been proposed by numerous workers to use a porous hydrophobic membrane to present a large number of tiny vapor gaps between the distilland and distillate. The surface tension of such a hydrophobic material prevents water intrusion into these vapor gap pores.

Because the efficient recovery of fresh water from seawater is perhaps the most important use of this technology, the invention to be described is particularly directed to utilizing hydrophobic membranes, though the methods are applicable to any distillation system.

The reduced energy cost for fresh water from membrane distillation of seawater has prompted study of this technology by many companies. Unfortunately, the process has not proven practical because of a phenomenon known as "waterlogging". Waterlogging is the intrusion of water into the membrane pore or vapor gap from either the fresh water (distillate) or the salt water (distilland) side. When the water fills the pore, the vapor barrier required for evaporation and condensation, which in turn is required for the separation of the salt from the fresh water side, is destroyed. Without the presence of the vapor gap, salt passes into the fresh water side and fresh water passes back to the salt side, resulting in both product contamination and gross thermal inefficiency. Proposals have been made to make the membranes from very hydrophobic materials containing very small diameter pores, to treat the membranes in various ways to render them impermeable to liquid water, and to reverse waterlogging after it has occurred by draining the membrane distillation apparatus, and then blowing air through the system to dry out the pores. Once the pores have been dried, then water can be readmitted to the system and the membrane distillation process can begin again. Unfortunately, it is found that the drying step is required every few days and at such high frequency is not a commercially practical remedy.

It has been thought by most workers in the field that if a sufficiently hydrophobic membrane containing very uniformly small diameter pores were found, the problem of waterlogging would be solved. Surprisingly, however, numerous experiments conducted using very hydrophobic membranes (teflon and polyvinylidene fluoride) with uniformly small pores show that waterlogging can still occur. Waterlogging results in a large increase in density of the membrane material, and a large decrease in fresh water production rate. Waterlogging is evidenced by the passage of dissolved salts and liquid dyes through the membranes, which show the vapor gaps have been destroyed. A large number of experiments have been performed by applicant to try to determine the mechanism for waterlogging and thereby find a method for preventing it. The tests use polyvinylidene fluoride membranes (including Millipore's membrane type GVHP29325 with a nominal maximum pore diameter of 0.22 microns) and teflon membranes (including Millipore's membrane type FHLP29300 with a nominal maximum pore diameter of 0.5 microns).

SUMMARY OF THE INVENTION

The present invention contemplates a pretreatment step in a membrane distillation method and system wherein surfactants are removed from the distilland or feedwater upstream of a membrane distillation section. In a preferred embodiment this is accomplished through adsorption of such surfactants by activated charcoal carried in a guard bed reactor installed in the feedstream. Such surfactants may also be removed by reaction with activated alumina or ion exchange resins or by means of molecular sieves.

DETAILED DESCRIPTION OF THE PREFERRED EMBODIMENTS

Figure 1:
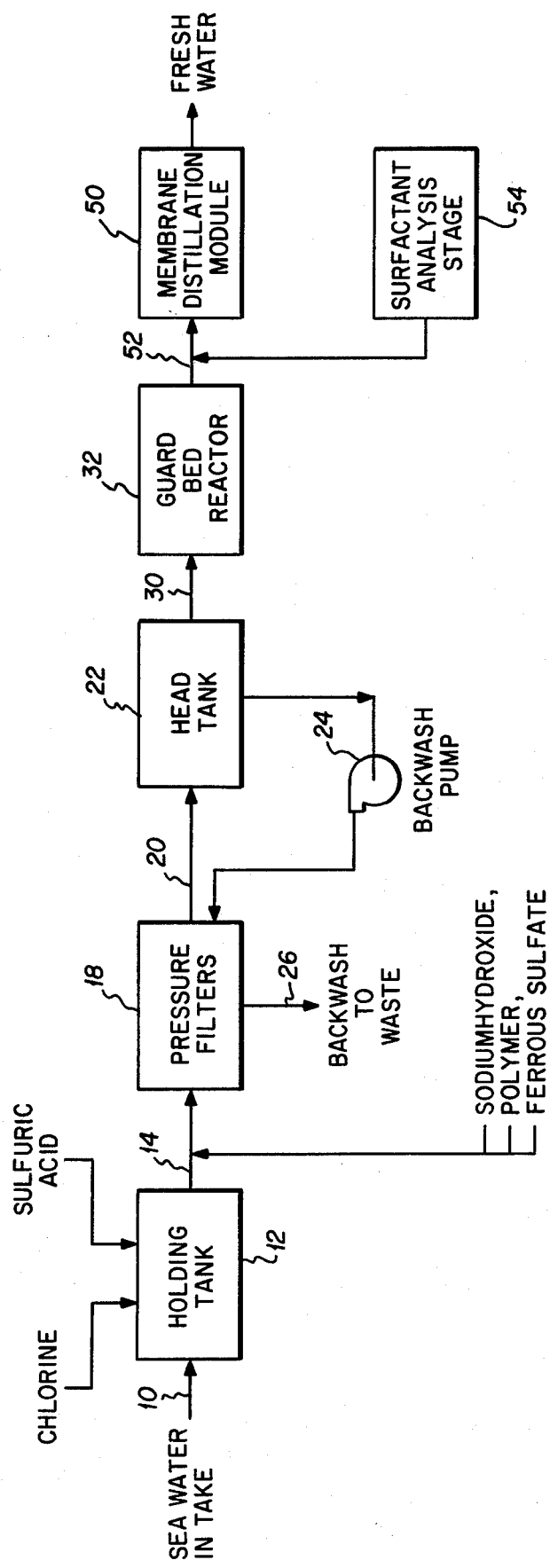
FIG. 1 is a flow diagram illustrating the water treatment steps in a membrane distillation system in accordance with a preferred embodiment of this invention.

A series of tests on polyvinylidene fluoride and teflon membranes used in a saline water distillation method show that bacteria, algae, dirt, the level of salts in the solution, and operating temperatures up to as high as 200° F. have no effect on the stability of the water production rate; that is, they do not cause waterlogging, for periods exceeding 1000 hours. Other materials such as iron and silica, which are common problem contaminants in the reverse osmosis art, also show no adverse effects on membrane distillation water production rates in similar tests for over 1000 hours.

Other tests, however, show that the addition of a small amount of surfactant causes massive and immediate water-logging within minutes. A surface active agent, or surfactant, is a material which in solution exhibits special solubilization, especially at solid/liquid interfaces where they often are found to concentrate, the lowering of surface tension especially at such interfaces, and the increased penetration of the liquid in which it is dissolved into various porous solid materials.

Modern soaps contain many very active surfactants, but the term can include any material which lowers the surface tension of the liquid in which it is placed.

One test involving a one time addition of 0.07 wt. % soap solution to the feed stream, a known surfactant, showed massive and complete waterlogging of the membrane, leading to the complete cessation of fresh water production within one hour. The effect of adding 0.1 wt. % polyvinyl alcohol, another known but only moderately active surfactant, is similar, though is less severe probably because of polymerization of the polyvinyl alcohol. Conversely, similar tests in which no surfactants are allowed to build up in the system have run with no waterlogging for well over 1000 hours.

It is clear from the tests that surfactants are a serious cause of waterlogging. The reason for their effect and the mechanisms by which they act are not completely understood, because, even though surfactants act to lower the surface tension of water, the reduction would appear to the prior art to be insufficient to allow penetration of the liquid water into the very small diameter vapor gap pores.

However, the magnitude of the problem can be understood when it is considered that in any area where commercial desalination plants are located, there will be surfactants in the feedwaters due both to their natural occurrence from local flora and fauna in the seawater and due to runoff of industrial and municipal wastes from local populations or industries. It is also possible that a disgruntled individual could cause total cessation of fresh water production from a commercial membrane distillation desalination plant by contaminating the feedwater with the surfactant available in a large bottle of dishwashing soap.

Applicant has found that the above problems may be overcome by installing a guard bed containing a material capable of removing surfactants from salt water feed stream to the plant. Placing this guard bed in the feed stream immediately upstream of the membrane distillation section of the plant prevents access of any surfactants from either natural or unnatural causes to the vapor gap membranes. The guard bed may contain any appropriate material which removes surfactants from the feed salt stream by adsorption, absorption or any chemical reaction.

With reference now to FIG. 1, seawater is introduced through intake 10 into holding tank 12 for conventional chemical pretreatment during a residence time of about 15 to 30 minutes. Chlorine is added to kill bacteria. Sulfuric acid is added to prevent carbonate compound scale formation by lowering the pH value of the solution and driving off carbon dioxide. As the stream is next passed along line 14 the conventional treatment includes the addition of sodium hydroxide to restore the pH value of the solution, further polymer addition for more scale prevention, especially by sulfonate compounds and residual carbonate compounds and ferrous sulfate as a coagulant to increase the size of suspended contaminant particles for better subsequent filtration. The next stage is one or more pressure filters 18 usually of the multi-media type containing different sized sand filters graduated from larger to smaller for removal of suspended solids. The output is passed then along line 20 to a head tank 22 from which back wash pump 24 may be interconnected to pressure filters 18 for periodic cleaning. Residual water from this stage is drained off along line 26.

Figure 2:
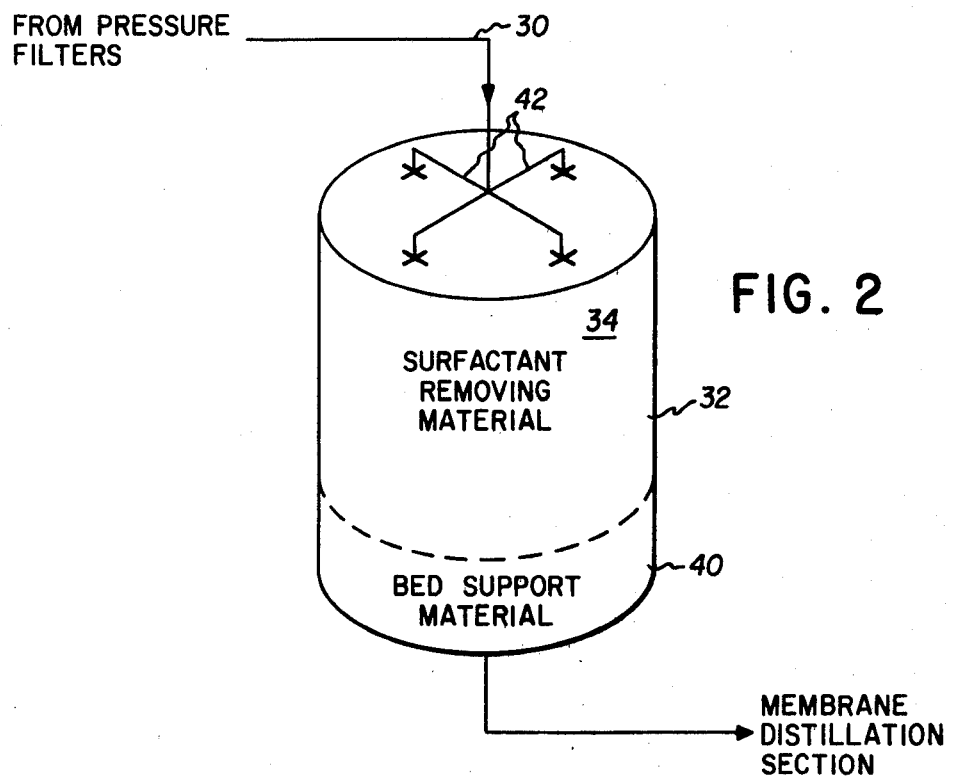
FIG. 2 is a detail of the guard bed reactor of FIG. 1.
Figure 3:
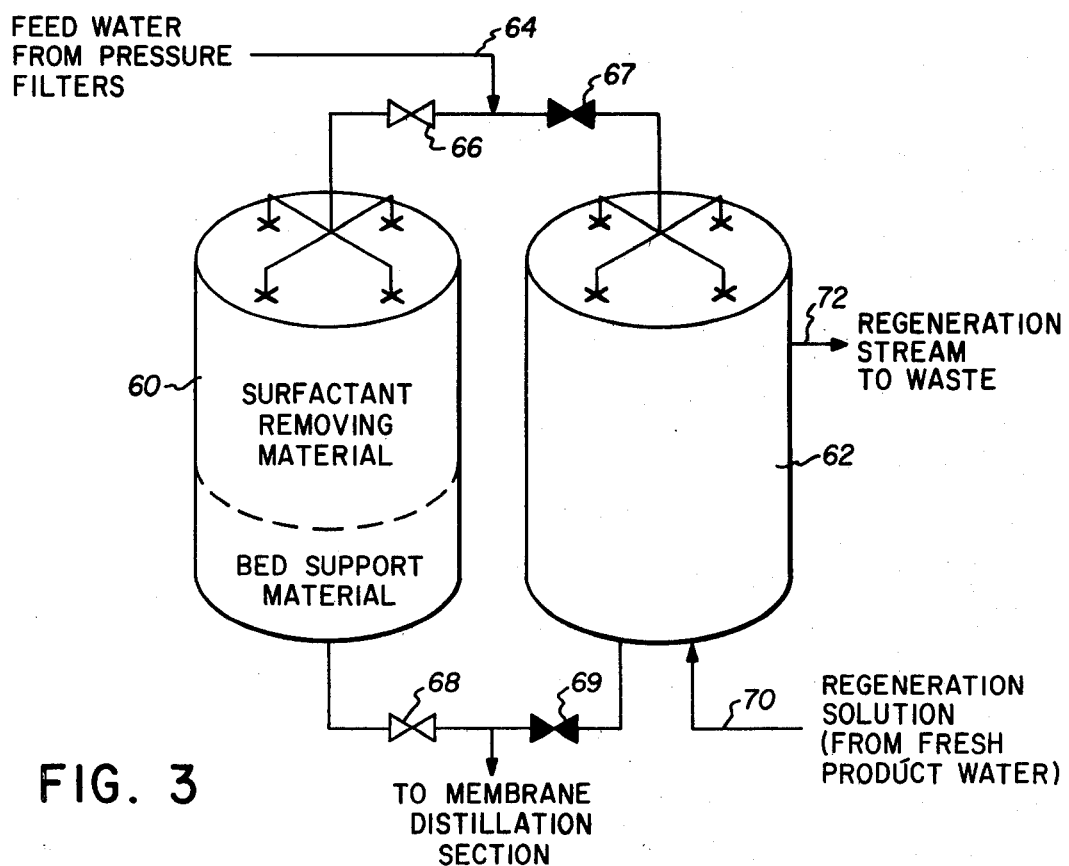
FIG. 3 is a detailed diagrammatic view of guard bed reactors in accordance with an alternate embodiment of this invention.

The feed stream is now introduced along line 30 into one or more guard bed reactors 32 whose function is to remove surfactants from the water. As best seen in FIG. 2, a guard bed reactor 32 contains a bed of surfactant removing material 34, such as activated charcoal supported on a bed of water collecting material 40, for example, ¼ inch gravel. Reactor 32 is preferably of the trickle-bed contacting type including a plurality of spray heads 42 at the top of the bed 34.

A tyical size for a trickle-bed type carbon contactor treating a flow of one million gallons per day is a 15 ft. diameter by 15 ft. deep chamber with a superficial contact time of about 30 minutes and a hydraulic loading of 3.9 gpm per square foot. Such a reactor may contain for example 66,000 pounds of 8×30 mesh granular activated carbon. If desired, reactor 32 may alternately be of the fixed or fluid bed type and may be operated either upflow or downflow or separated into a plurality of reactors to treat the flow stream in multiple stages.

The effluent from guard bed reactor 32 is now introduced into membrane distillation module 50 along line 52 for final production of fresh water.

The porous hydrophobic membrane materials usable in the present invention are well known to the art and there is no need to describe them here in detail. Suffice it to say that among the most hydrophobic materials are polyvinylidene fluoride and teflon. There are many others which exhibit the necessary degree of hydrophobicity to support a membrane distillation process. Likewise, it is deemed unnecessary to detail the mechanics of construction of a module 50 containing a multiplicity of cascaded hydrophobic membranes usable in a membrane distillation process. As noted above, such modular constructions are fully articulated by Rodgers and other workers in the field. It is sufficient to say that the advantages of surfactant removal discovered by the applicant are equally adaptable to any selection of membrane material and any single or multi-stage system, modular or otherwise, for implementing a membrane distillation process and system.

In order to establish that surfactants have indeed been adequately removed by reactor 32, an analysis for the presence of surfactants is conducted at stage 54, which samples feed stream 52. A well known method is the so-called methylene blue method. This method depends on the formation of a blue salt when methylene blue reacts with anionic surfactants including LAS (linear alkylate sulfonate), alkyl sulfates and many other materials of the surfactant class. The methylene blue method has been successfully applied to the examination of surfactant content in drinking water and is highly sensitive.

The use of activated charcoal as an agent for removal of impurities from water is well known. One such material is that class of compounds known as surfactants or surface-active agents. The removal of such surfactants from water has been a matter of considerable concern with the rise in popularity of synthetic detergents and the number of detergent caused foaming incidents. What has not been realized thus far, however, to applicant's knowledge, is the critical importance of removal of such surfactants as a part of a membrane distillation system for desalination or other purposes.

There is, of course, no intention to limit the charcoal removing material in this invention to activated charcoal. Other types of materials which may be used include activated alumina or silica and ion exchange resins. Molecular sieves may also be used. In general, however, it should be noted that regenerable materials are preferable.

In an alternate embodiment of this invention a pair of guard bed reactors 60 and 62 may be connected across a feed stream 64 in parallel. Valves 66, 67, 68, and 69 may be alternately opened and closed in tandem so as to switch back and forth between reactors 60 and 62. For example, while reactor 60 is in operation reactor 62 may be disconnected and subjected to a regeneration step wherein regeneration solution is introduced in a known manner along line 70 and passed to waste along line 72. There are many methods of charcoal regeneration well known to the art. The use of steam in this regard is often found to be effective for regeneration of such charcoal. The size of guard beds 60 and 62 will determine their usable life before becoming saturated but this will have to be optimized for the specific conditions for each plant.

Within the scope of this invention it should be understood that the key element is the blocking of the waterlogging effect of surfactants. Thus, any means or method for neutralizing this effect whether by means of a reactor bed material or by water treatment is comprehended within the scope of this invention as described and claimed herein.

What is claimed is:

1. In a distillation system wherein a liquid distilland and a liquid distillate are separated by a porous membrane through which the distillate passes in a vapor phase, the improvement comprising the step of pretreating said distilland to remove surfactants therefrom in order to prevent liquid intrusion into said membrane.

2. A method as in claim 1 wherein such step of surfactant removal includes adsorption of such surfactants by activated charcoal.

3. A method as in claim 1 wherein such step of surfactant removal includes adsorption of such surfactants by activated alumina.

4. A method as in claim 1 wherein said step of surfactant removal includes reaction of such surfactants with an ion exchange resin.

5. A method as in claim 1 wherein said step of surfactant removal includes filtering out such surfactants with molecular sieves.

6. In a desalination system of the type including a porous hydrophobic membrane through which a feed stream of saline water is distilled as a vapor and recondensed as fresh water, the improvement comprising means for prevention of water intrusion into the pores of said membrane including a surfactant removal stage interposed in said feed stream.

7. A system as in claim 6 wherein said surfactant removal stage comprises a bed of activated charcoal.

8. A system as in claim 6 wherein said surfactant removal stage comprises a bed of activated alumina.

9. A system as in claim 6 wherein said surfactant removal stage comprises an ion exchange resin.

10. A system as in claim 6 wherein said surfactant removal stage comprises a molecular sieve.

11. A system as in claim 6 wherein said surfactant removal stage comprises a pair of separate reactors including activated charcoal beds interposed in parallel in said feed stream, and wherein valving means are provided for alternately bypassing either of said reactors so as to permit regeneration of said activated charcoal therein.

12. A system as in claim 6 including means for continuously monitoring said feed stream for the presence of surfactants therein.

* * * * *